United States Patent Office 3,503,977
Patented Mar. 31, 1970

3,503,977
N,N'-DI-[2-PYRAMIDINYL-AMINOALKYL]-
DIAZACYCLOALKANES
Ernst Schweizer, Basel, Switzerland, assignor to Ciba Corporation, New York, N.Y., a corporation of Delaware
No Drawing. Filed July 12, 1967, Ser. No. 652,679
Claims priority, application Switzerland, July 28, 1966, 10,967/66; June 13, 1967, 8,370/67
Int. Cl. C07d 51/00
U.S. Cl. 260—256.5                     13 Claims

ABSTRACT OF THE DISCLOSURE

N,N'-di-[Py-aminoalkyl]-diazacycloalkanes in which the alkylene radicals separate the nitrogen atoms connected by them by at least 2 carbon atoms in each case, Py represents a pyrimidyl-2-residue, which has in the 4-position an amino group and in the 6-position a hydrogen atom, an amino group, a hydrocarbon residue of aromatic or aliphatic character in which the carbon chain can be interrupted by an oxygen, nitrogen or sulfur atom or a free or etherified hydroxyl or mercapto group, their N-oxides and salts, such as N,N'-di-[γ-dimethylamino-6-methyl-pyrimidyl-2-aminopropyl]-piperazine of formula

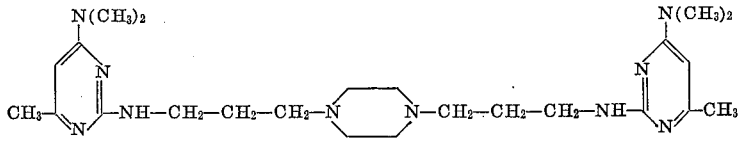

show antibacterial, antiprotozoal e.g. antiplasmodial activity and display anti-inflammatory effects.

SUMMARY OF THE INVENTION

The present invention concerns and has for its object N,N'-di-[Py-aminoalkyl]-diazacycloalkanes in which the alkylene radicals separate the nitrogen atoms connected by them by at least 2 carbon atoms in each case, Py represents a pyrimidyl-2-residue, which has in the 4-position an amino group and in the 6-position a hydrogen atom, an amino group, a hydrocarbon residue of aromatic or aliphatic character in which the carbon chain can be interrupted by an oxygen, nitrogen or sulfur atom, or a free or etherified hydroxyl or mercaptogroup, their N-oxides and salts, corresponding pharmaceutical compositions, as well as methods for the preparation of these products. The new compounds, especially in the form of the pharmaceutical compositions containing them posses valuable pharmacological properties. More especially, they act against bacteria, such as tubercle bacilli, above all against protozoa, especially plasmodia, for example in the mouse, and against piroplasms such as babesia, babesiellae and theileriae. They also act against plasmodia that resist known antimalarial medicaments. The new compounds may therefore be used pharmacologically on animals or as medicaments, for example for treating malaria, babesiosis, theileriosis, anaplasmosis and other infections. Furthermore, for example, in the rat, the new compounds display an anti-inflammatory action and may thus be used pharmacologically on animals or medicinally as antiphlogistics. The new products can also be used as animal feedstuffs or as additives to animal feedstuffs.

DESCRIPTION OF THE PREFERRED EMBODIMENTS

In the new compounds the hydrocarbon residues of aliphatic character are e.g. aliphatic, cycloaliphatic, cycloaliphatic aliphatic or araliphatic hydrocarbon residues.

Aliphatic hydrocarbon residues are above all alkyl or alkenyl groups, e.g. lower alkyl or alkenyl groups, e.g. methyl, ethyl, n or isopropyl groups or straight or branched isomers of butyl or pentyl groups or allyl or methallyl groups.

Cycloaliphatic hydrocarbon residues are particularly cycloalkyl or cycloalkenyl residues, which can also be substituted by lower alkyl groups e.g. if desired by lower alkyl substituted cyclopropyl, cyclopentyl, cyclohexyl, cycloheptyl, cyclopentenyl, cyclohexenyl or cycloheptenyl residues.

Cycloaliphatic-aliphatic hydrocarbon residues are above all cycloalkyl-alkyl or -alkenyl or cycloalkenyl-alkyl or -alkenyl residues wherein each of the groups are the same as the ones mentioned before.

Araliphatic hydrocarbon residues are e.g. alkyl or alkenyl residues with at least one phenyl substituent, e.g. above all, benzyl, phenylethyl, phenylalkyl or benzhydryl groups.

Aromatic hydrocarbon residues are above all phenyl residues. The aryl groups can be unsubstituted or substituted by one, two or more of the same or different residues wherein substituents are lower alkyl groups as defined above or lower alkoxy groups containing the lower alkyl substituents as mentioned above, halogen atoms such as chlorine, bromine or fluorine atoms or trifluoromethyl groups.

The hydrocarbon residues of aliphatic character which are interrupted in their carbon chain by oxygen, nitrogen or sulfur atom are for example, oxa-, aza, or thiaalkyl-, cycloalkyl or aralkyl residues such as lower alkoxy-lower alkyl residues in which the alkyl groups have the meaning given above, aralkoxy or aryloxy lower alkyl groups e.g. benzyloxy or phenoxy methyl-, ethyl- or propyl groups or such groups in which the oxygen atom can be replaced by a sulfur atom or by a lower alkylated imino group.

The etherified hydroxyl or mercapto groups are e.g. lower alkoxy, lower alkyl mercapto groups, aralkoxy- or aralkylmercapto groups e.g. methoxy-, ethoxy-, n- or isopropoxy- or the different isomers of butoxy, pentoxy or hexoxy groups, benzyloxy or phenethoxy groups in which the phenyl ring can be substituted, or the corresponding groups in which the oxygen atom can be replaced by a sulfur atom.

Amino groups as substituents of the pyrimidine ring may be, for example, primary, secondary or tertiary. Suitable N-substituents are, for example: Lower hydrocarbon residues of aliphatic character, whose carbon chain may be interrupted by hetero atoms such as oxygen, sulfur or nitrogen and/or which may be substituted by free hydroxyl or amino groups. Lower hydrocarbon residues of aliphatic character as substituents of the amino groups are above all alkyl, alkenyl cycloalkyl, cycloalkenyl or, cycloalkyl-alkyl- or -alkenyl, or cycloalkenyl alkyl or -alkenyl radicals containing up to 8 carbon atoms. Residues of this kind that are interrupted by hetero atoms are above all oxaalkyl, azaalkyl, oxaalkylene, azaalkylene or oxacycloalkyl-alkyl radicals. Lower hydrocarbon residues interrupted by hetero atoms include above all also aminoalkyl radicals in which the amino group is substituted as indicated above and described below. There may be specially mentioned as substituents of the amino groups methyl, ethyl, allyl, propyl, isopropyl residues; linear or branched butyl, pentyl, hexyl or heptyl residues bound in any desired position; 3-oxabutyl, 3-oxapentyl, 3-oxaheptyl, 2-hydroxyethyl, 3-hydroxypropyl, butylene-(1,4), pentylene-(1,5), hexylene-(1,5), hexylene-(1,6), hexylene-(2,5), heptylene-(1,7), heptylene-(2,7), heptylene-(2,6), 3-oxa-pentylene-(1,5), 3-aza-pentylene-(1,5), 3-lower alkyl - 3 - aza-pentylene-(1,5), such as 3-methyl-3-aza-pentylene-(1,5), 3-(hydroxy-lower alkyl)-3-aza-pentylene-(1,5) such as 3-hydroxyethyl-3-azapentylene-(1,5), 3 - oxa-hexylene-(1,6) or 3-aza-hexylene-(1,6), cyclopropyl, cyclopentyl or cyclohexyl residues, cyclopropyl or cyclopentyl- or cyclohexyl-methyl or -ethyl residues.

The amino groups are preferably tertiary amino groups, especially di-lower alkyl-amino groups such as dimethylamino, diethylamino, N-methyl-N-ethylamino, dipropylamino, di-isopropylamino, dibutylamino, di-secondary butylamino or di-amylamino groups, or pyrrolidino, piperidino, piperazino, N-lower alkyl- or N-hydroxy-lower alkyl-piperazino or morpholino groups. The amino group may also be a lower alkylamino group substituted by one of the aforementioned secondary or tertiary amino groups, such as a mono- or di-lower alkylamino pyrrolidino, piperidino, piperazino, N-lower alkyl-piperazino or hydroxy-lower alkyl-piperazino or morpholino-lower alkylamino group or an N-lower alkyl pyrrolidinyl-2-or 3-lower alkylamino or N-lower alkyl-piperidyl-2-, 3- or 4-lower alkyl amino groups.

The amino group in the 2-position of the pyrimidine ring can also be further substituted, e.g. by a lower alkyl group such as mentioned above or an aralkyl group e.g. a phenyl lower alkyl group e.g. a benzyl or phenethyl group.

The diazacycloalkane ring, in which the alkylene radicals separate the nitrogen atoms by at least 2 carbon atoms, thus contains at least 6 cyclic members, and preferably at most 8 cyclic members. The alkylene radicals are above all linear or branched alkylene radicals each containing at most 6 carbon atoms, for example butylene-(2,4), butylene-(1,4), pentylene-(1,5), pentylene-(2,5), hexylene-(2,6) or hexylene-(3,6) or above all an ethylene-(1,2) residue propylene-(1,3) or propylene-(2,3) or propylene-(1,2). In the first place the diazacycloalkane ring is a piperazine ring which may be substituted by lower alkyl radicals, above all by methyl groups, and is especially a piperazine ring.

pyrimidine ring can also be jointed with each other to form a ring e.g. to form a 5–6 membered carbocyclic ring.

The two pyrimidylaminoalkyl residues in the new compounds may be identical or different.

Particularly valuable, above all in their action against plasmodia and babesia and as anti-inflammatory substances are compounds of the formula

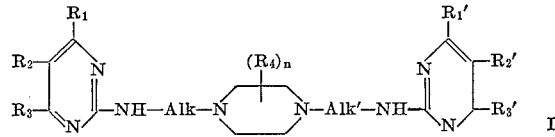

I wherein Alk and Alk' represent lower alkylene (1,7) residues with 2 to 6 carbon atoms, above all 2–4 carbon atoms and in the first place propylene (1,>1) residues especially propylene (1,3) residues, $R_1$ and $R_1'$ each represent a free or substituted amino group above all one of those specially mentioned above and particularly di-lower alkylamino, pyrrolidino, piperidino, morpholino, piperazino or N-lower alkyl or N-hydroxylower alkyl piperazino groups e.g. as indicated above and especially a diethylamino group or, preferably a dimethylamino group, $R_3$ and $R_3'$ represent hydrogen atoms, amino groups e.g. those mentioned for $R_1$ and $R_1'$ or lower alkyl or lower alkoxy-lower alkyl residues, especially those mentioned above, particularly propyl, ethyl, methoxy ethyl, ethoxyethyl and especially methyl, and the residues $R_2$ and $R_2'$ are above all hydrogen atoms and in the second place lower alkyl or lower alkoxy-lower alkyl residues, above all alkyl residues especially such as those described for $R_3$ and $R_3'$, $R_4$ represents H, or a lower alkyl residue and $n$ is an integer from 1–4.

Deserving special mention are compounds of the formula

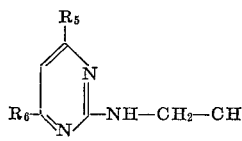 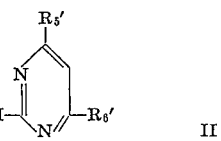

II wherein the residue $R_5$ and $R_5'$ are pyrrolidino, piperidino, morpholino, piperazino and N-lower alkyl or N-hydroxy-lower alkyl piperazino groups and above all di-lower alkylamino groups e.g. those mentioned above specially diethylamino or better dimethylamino groups. $R_6$ and $R_6'$ represent H, or lower alkyl, such as propyl, ethyl or above all methyl and in the first place N,N'-di[γ-(4-dimethylamino - 6 - methyl - pyrimidyl - 2 - aminopropyl]-piperazine of formula

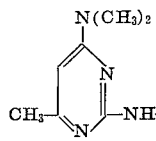 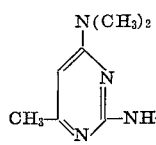

The alkylene residues which separate the diazacycloalkane nitrogen by at least 2 carbon atoms from the pyrimidyl-2-amino groups contain from 2 to 6 carbon atoms and are e.g. ethylene (1,2); propylene (2,3), propylene (1,2), butylene (2,4), butylene (1,4), pentylene (1,5), pentylene (2,5)-hexylene (1,6) or hexylene (2,6) or above all propylene (1,3) groups.

The new compounds may also be substituted in the 5-position of the pyrimidine drugs e.g. by hydrocarbon residues of aliphatic character which may also be interrupted in the carbon chain by oxygen, sulfur, nitrogen e.g. in the manner described before, or by a free or etherified hydroxyl or mercapto group e.g. as described before. The alkyl groups in positions 5 and 6 of the which e.g. shows in the mouse when given subcutaneously in 10–30 mg./kg. does a significant antimalarial action.

The new compounds are obtained in the usual manner; advantageously, an N,N'-di-(X-alkyl)-diazacycloalkane in which the alkylene chains separate their substituents by at least 2 carbon atoms in each case, is reacted with 2 molecules of a compound of formula Py—Y, wherein Y is a reactively esterfied hydroxyl group, being above all a halogen atom, especially chlorine or an etherified, for example lower alkylated or aralkylated, such as benzylated, mercapto group, or a quaternary ammonium group, such as a tri-lower alkyl-ammonium group, and X is an amino group containing at least one hydrogen atom.

Furthermore, the new compounds can also be prepared by reacting an N-unsubstituted N'-[Py-aminoalkyl]-diazacycloalkane, in which Py has the meaning given above, and in which the alkylene chains separate the nitrogen atoms in each by at least 2 carbon atoms, with a reactive ester of a compound of the formula Py-aminoalkyl-OH in which Py has the meaning given above and in which the alkylene chain separates the oxygen atom from the nitrogen atom by at least 2 carbon atoms. Suitable reactive esters are above all halogen atoms, such as chlorine, bromine or iodine, or sulphonyloxy groups, such as benzene sulphonyloxy groups.

Furthermore the new compounds can be obtained by exchanging Py' for Py in N,N'-di[Py'-aminoalkyl]-diazacycloalkanes in which the alkylene residue in each case separate the nitrogen atom attached to them by at least 2 carbon atoms and Py' represents a pyrimidyl residue which differs from the radical Py defined above by having at least in one of the positions 4 and 6 a radical exchangeable for an amino group or respectively a free or etherified hydroxyl group or mercapto group or hydrogen atom.

This exchange follows the usual procedure, e.g. it is possible to start with compounds in which the residue Py' differs from the residue Py described above by having in 4-position a halogen atom or a free or etherified mercapto group e.g. an alkylated or benzylated mercapto group. In these compounds the halogen atom or free or etherified mercapto group can be replaced by an amino group e.g. by reaction with ammonia, or primary or secondary amine. It is also possible to start from 4,6 dihalogenopyrimidine compounds and replace the halogen groups with amino groups e.g. by the reaction mentioned above. Further in pyrimidine compounds which are substituted in 4-position by an amino group and in 6-position by a halogen atom, the halogen atom can be replaced by an amino group e.g. by the reaction mentioned above or against a free or etherified hydroxyl or mercapto group or a hydrogen atom.

The exchange of the halogen atom in 6-position against a free hydroxyl group is carried out e.g. by alkaline hydrolysis e.g. with aqueous alkalies. The exchange of halogen atoms for an etherified hydroxyl group or a free or etherified mercapto group is carried out e.g. by treatment with alcohol, hydrogen, sulfide or mercaptans in the form of their salts in the presence of condensing agents which form such salts. The replacement of the halogen atom against the hydrogen atom can be done e.g. by dehalogenative hydrogenation e.g. by hydrogenation in the presence of nickel or palladium catalysts.

Halogen atoms in the radical Py' are e.g. bromine or particularly chlorine atoms.

In the compounds obtained, substituents can be exchanged in the usual manner e.g. free or etherified mercapto groups in 6-position of the pyrimidine rings can be replaced by amino groups in the usual manner optionally in the presence of condensing agents by reaction with ammonia, primary or secondary amines. α - Aralkyl residues or amino groups may be replaced by hydrogen atom in the usual manner e.g. by treatment with reducing agents like hydrogen in presence of catalysts. Further free hydroxyl or mercapto groups can be exchanged with etherified hydroxyl or mercapto groups. The exchange of free mercapto groups for an etherified mercapto group is carried out e.g. by treatment with reactive esters e.g. halides, sulfates, sulfonates of corresponding alcohols. The exchange of the free hydroxyl group for an etherified hydroxyl group is carried out above all by exchange of hydroxyl groups for a halogen atom e.g. by reaction with halides of phosphorous or sulfur especially phosphorous pentahalide or phosphorous oxyhalide above all chlorides followed by exchange of the halogen atoms by an etherified hydroxyl group e.g. by reaction with alcohol or metal alcoholates such as alkali alcoholates.

The afore-mentioned reactions are carried out in the usual manner, in the presence or absence of diluents and/or condensing agents and/or catalysts, at room temperature or with cooling or heating, if required under superatmospheric pressure and/or in an inert gas.

Depending on the reaction conditions used the new compounds are obtained in the free form or in the form of their salts. The bases form therapeutically acceptable salts on treatment with acids, for example therapeutically acceptable acids such as hydrohalic acids, sulphuric or phosphoric acids, nitric or perchloric acid; aliphatic, alicyclic, aromatic or heterocyclic carboxylic or sulphonic acids, such as formic, acetic, propionic, oxalic, succinic, glycolic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicyclic, embonic, or para-aminosalicyclic acid; methanesulphonic, ethanesulphonic, hydroxyethanesulphonic, ethylenesulphonic acid; toluenesulphonic, naphthalenesulphonic acids or sulphanilic acid; methionine, tryptophan, lysine or arginine. Resulting salts can be converted into the free compounds.

The salts may also be used for purifying the free compounds. In view of the close relationship between the new compounds in the free form and in the form of their salts, what has been said above with reference to the free compounds concerns also the corresponding salts wherever this is possible and useful.

The invention includes also any variant of the process in which an intermediate obtained at any stage of the process is used as starting material and any remaining step/steps is/are carried out or the process is discontinued at any stage thereof, or a starting material is formed under the reaction conditions or is used in the form of a salt thereof, as well as the new starting materials. It is advantageous to use starting materials and reaction conditions that give rise to the final products specially mentioned above.

The resulting diazacycloalkane compounds can be converted into their N-oxides in the usual manner, for example by means of hydrogen peroxide or organic peracids, such as perbenzoic or peracetic acid.

A resulting racemic compound can be split into its optical antipodes in the usual manner.

The starting materials are known or are prepared by analogous methods. New starting materials are likewise included in the present invention. Starting materials that differ from the final products by the presence of a residue exchangeable for hydrogen in at least one of the alkylene radicals, especially the oxo compounds, likewise have the effects described above for the final products and are included in the present invention; they are obtained by one of the known relevant methods referred to above, for example from corresponding starting materials containing an oxo group.

The new final products and their salts can be used as medicaments, for example in the form of pharmaceutical preparations containing the new compounds or their salts in conjunction or admixture with an organic or inorganic, solid or liquid pharamaceutical excipient suitable for enteral or parenteral administration. Suitable excipients are substances that do not react with the new compounds, for example water, lactose, starches, magnesium stearate, talcum, vegetable oils, benzyl alcohols, gums, polyalkyleneglycols cholesterol or other known medicinal excipients. The pharmaceutical preparations may be, for example, tablets or dragees, or in liquid form solutions, suspensions or emulsions. They may be sterilized and/or may contain auxiliaries, such as preserving, stabilizing, wetting or emulsifying agents, salts for regulating the osmotic pressure or buffers. They may also contain other therapeutically useful substances.

The following examples illustrate the invention.

EXAMPLE 1

15.5 g. of 2-methylmercapto-6-methyl-4-amino-pyrimidine and 8.5 g. N,N'-di-(β-aminoethyl)-piperazine are mixed and heated at 250° C. in a metal bath. The product which solidified was boiled with alcohol and filtered.

in a metal bath, then cooled to 50° C., and poured into ice-water. The N,N' - di - [β-(6-methyl-4-dimethylamino-pyrimidyl-2-amino)-ethyl]-piperazine of the formula

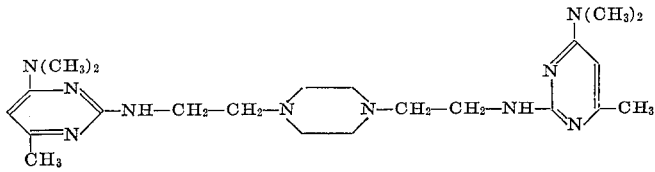

The resulting N,N'-di-[β-(6 - methyl-4-amino-pyrimidyl-2-amino]-piperazine of formula

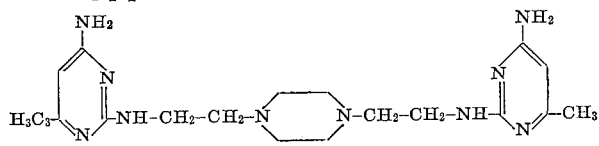

is recrystallised from dimethylformamide; M.P. 266–271° C.

The starting material 2-methylmercapto-6-methyl-4-amino pyrimidine can be obtained as follows: To 69.6 g. of 2-methylmercapto-6-methyl - 4 - chloropyrimidine in 0.51 methanol in an autoclave is led in under pressure 30 g. of ammonia and the mixture heated at 120° C. for 5 hours. It is then evaporated to dryness and the residue taken up in a little water and filtered. The 2-methylmercapto-6-methyl-4-amino-pyrimidine of formula

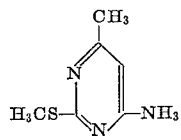

is recrystallised from methanol-water, M.P. 135–137° C.

Example 2

9.1 g. of 2-methylmercapto-4-methyl-6-dimethylamino-pyrimidine and 5.0 g. N,N'-di-γ-aminopropyl)-piperazine are heated together in a metal bath at 240–250° C. for a period of 3 hours. The reaction product is taken up in water and the separated N,N'-di[γ-(6-methyl-4-dimethyl-amino-pyrimidyl-2-amino)-propyl]-piperazine of the formula

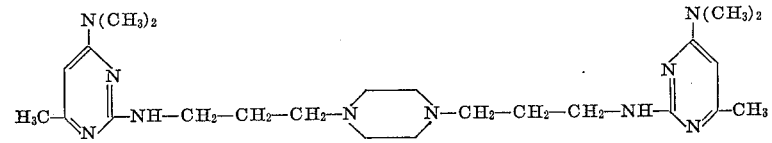

is filtered and recrystallised from methanol-water; M.P. 183–185° C.

The starting material is obtained as follows: Into a solution of 69.6 g. of 2-methylmercapto-6-methyl-4-chloropyrimidine is led in dimethylamine when the solution warmed up. The mixture is heated for 1 hour at 60° C. The solvent is distilled off and the residue taken up in water and methylene chloride. The extract is dried over sodium sulfate and solvent removed. The resulting oil is fractionally distilled to give 2-methylmercapto-6-methyl-4-dimethylamino-pyrimidine of formula

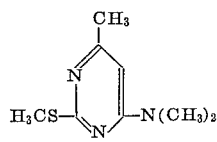

B.P., 162–165°/12 and M.P. 43–44° C.

Example 3

A mixture of 18.3 g. of 2-methylmercapto-6-methyl-4-dimethylamino-pyrimidine and 8.6 g. of N,N'-di-(β-amino-ethyl)-piperazine is heated at 230° C. for 3 hours which precipitates is filtered off with suction and recrystallized from aqueous methanol. Melting point, 198–200° C.

Example 4

18.3 g. of 2 - methylmercapto-6-methyl-4-dimethyl-amino-pyrimidine and 11.4 g. of N,N'-di(δ-amino-n-butyl)-piperazine are intimately mixed and heated at 240–250° C. for 3 hours. The reaction mixture is then allowed to cool to 100° C., stirred into ice-water, and the oily residue recrystallized several times from aqueous methanol. The resulting N,N'-di[δ-(6-methyl-4-dimethylamino-pyrimidyl-2-amino)-n-butyl]-piperazine of the formula

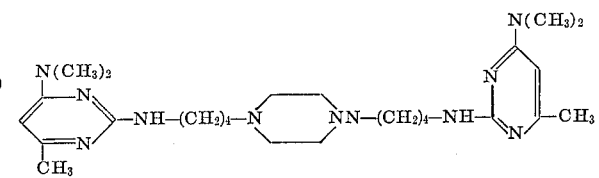

melts at 140–142° C.

Example 5

10.4 g. of 2-methylmercapto-4-methyl-6-pyrrolidino-pyrimidine and 5 g. of N,N'-di-(γ-aminopropyl)-piperazine are heated at 240–250° C. for 3 hours. On cooling, the mass solidifies, and is powdered, digested several times with water, filtered with suction, and recrystallized from aqueous methanol. The resulting N,N'-di-[γ-(6-methyl-4-pyrrolidino-pyrimidyl - 2 - amino)-propyl]-piperazine of the formula

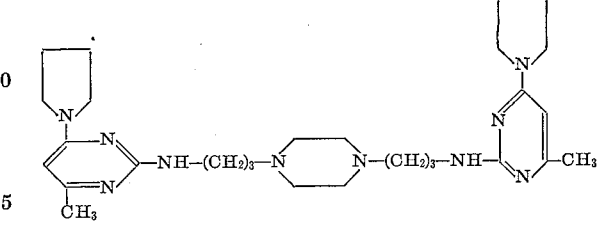

melts at 169–172° C.

The starting material can be obtained as follows: 34.8 g. of 2-methylmercapto-6-methyl-4-chloro-pyrimidine are dissolved in 300 ml. of methanol, and to the solution are added dropwise 31 g. of pyrrolidine in 100 ml. of methanol. The solution is stirred for 2 hours at 60° C., then water is added dropwise until the solution becomes turbid. The precipitate that forms is filtered off with suction and distilled for purification. The resulting 2-methylmercapto-4-methyl-6-pyrrolidino-pyrimidine of the formula

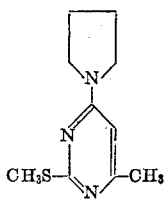

boils at 156–160° C. under a pressure of 0.6 mm. of Hg.

I claim:
1. A compound having the formula

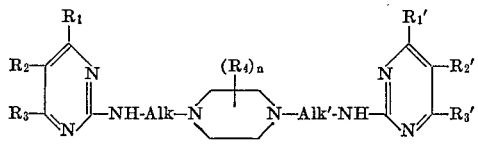

wherein Alk and Alk' each represents lower alkylene-(1,>1)- having 2–6 carbon atoms, $R_1$ and $R_1'$ each represents a free amino group or an amino group substituted by a member selected from the group consisting of lower alkyl, lower alkenyl, cyclo-lower alkyl, cyclo-lower alkenyl, cyclo-lower alkyl-lower alkyl, monooxa-lower alkyl, lower alkylene, monooxa-lower alkylene and monoaza-lower alkylene in which the cyclic nuclei have up to 8 carbon atoms, $R_3$ and $R_3'$ each stands for hydrogen, lower alkyl, lower alkoxy-lower alkyl, a free amino group or an amino group substituted by a member selected from the group consisting of lower alkyl, lower alkenyl, cyclo-lower alkyl, cyclo-lower alkenyl, cyclo-lower alkyl-lower alkyl, monooxa-lower alkyl, lower alkyene, monooxa-lower alkylene and monoaza-lower alkylene in which the cyclic nuclei have up to 8 carbon atoms, and the radicals $R_2$ and $R_2'$ each represents hydrogen, lower alkyl or lower alkoxy-lower alkyl and $R_4$ represents hydrogen or lower alkyl, and $n$ stands for a whole number from 1 to 4, and being in the free form or in the form of a therapeutically acceptable acid addition salt.

2. A compound as claimed in claim 1, said compound having the formula

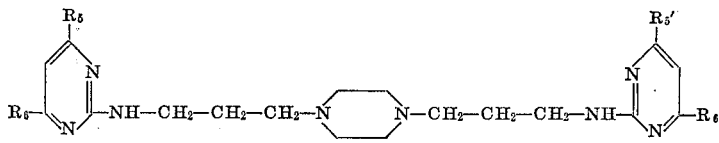

in which $R_5$ and $R_5'$ each represents a pyrrolidino, piperidino, morpholino, piperazino or N-lower alkyl or N-hydroxy-lower alkyl-piperazino group, ar a di-lower alkylamino group, $R_6$ and $R_6'$ represents hydrogen or lower alkyl, and being in the free form or in the form of a therapeutically acceptable acid addition salt.

3. A compound as claimed in claim 1, said compound being the N,N'-di-[γ-(4-dimethylamino-6-methyl-pyrimidyl-2-amino)propyl]-piperazine in the free form or in the form of a therapeutically acceptable acid addition salt.

4. A compound as claimed in claim 1, said compound being the N,N'-di - [β - (6-methyl-4-dimethylamino-pyrimidyl-2-amino)-ethyl]-piperazine in the free form or in the form of a therapeutically acceptable acid addition salt.

5. A compound as claimed in claim 1, said compound being the N,N'- di[δ -(6 - methyl-4-dimethylamino-pyrimidyl-2-amino)-n-butyl]-piperazine in the free form or in the form of a therapeutically acceptable acid addition salt.

6. A compounds as claimed in claim 1, said compound being the N,N'-di-[γ(6-methyl-4-pyrrolidino-pyrimidyl-2-amino)propyl]-piperazine in the free form or in the form of a therapeutically acceptable acid addition salt.

7. A compound as claimed in claim 1, said compound being in the form of a therapeutically acceptable acid addition salt.

8. A compound as claimed in claim 1, said compound being in the form of a therapeutically acceptable acid addition salt.

9. A compound as claimed in claim 2, said compound being in the form of a therapeutically acceptable acid addition salt.

10. A compound as claimed in claim 3, said compound being in the form of a therapeutically acceptable acid addition salt.

11. A compound as claimed in claim 4, said compound being in the form of a therapeutically acceptable acid addition salt.

12. A compound as claimed in claim 5, said compound being in the form of a therapeutically acceptable acid addition salt.

13. A compound as claimed in claim 6, said compound being in the form of a therapeutically acceptable acid addition salt.

References Cited

FOREIGN PATENTS 1,500,479   9/1967   France.

ALEX MAZEL, Primary Examiner

R. J. GALLAGHER, Assistant Examiner

U.S. Cl. X.R.

99—2; 260—240, 244, 246, 247.1, 247.2, 247.5, 256.4; 424—200, 248, 251

PO-1050
(5/69)

UNITED STATES PATENT OFFICE
CERTIFICATE OF CORRECTION

Patent No. 3,503,977    Dated March 31, 1970

Inventor(s) ERNST SCHWEIZER

It is certified that error appears in the above-identified patent and that said Letters Patent are hereby corrected as shown below:

Column 9, the right hand side of the formula of claim 2 should read:

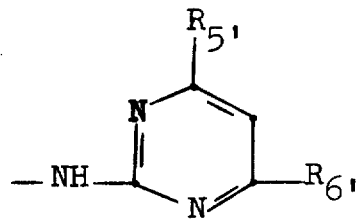

Column 10, line 2, after "alkyl" insert --- — ---; line 3, change "ar" to read --- or ---; line 9, after "amino)" insert --- — ---; line 21, after "[γ" insert --- — ---; line 22, after "amino)" insert --- — ---.

Signed and sealed this 30th day of March 1971.

(SEAL)
Attest:

EDWARD M. FLETCHER, JR.
Attesting Officer

WILLIAM E. SCHUYLER, JR.
Commissioner of Patents